(12) United States Patent
Wasif

(10) Patent No.: US 9,017,064 B2
(45) Date of Patent: Apr. 28, 2015

(54) UTILIZING A DILUENT TO LOWER COMBUSTION INSTABILITIES IN A GAS TURBINE ENGINE

(75) Inventor: Samer P. Wasif, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 644 days.

(21) Appl. No.: 12/795,786

(22) Filed: Jun. 8, 2010

(65) Prior Publication Data
US 2011/0300491 A1    Dec. 8, 2011

(51) Int. Cl.
*F02C 3/30* (2006.01)
*F23R 3/28* (2006.01)
*F23N 1/08* (2006.01)
*F23N 5/16* (2006.01)

(52) U.S. Cl.
CPC ... *F23R 3/28* (2013.01); *F02C 3/30* (2013.01); F23K 2301/103 (2013.01); F23L 2900/07003 (2013.01); *F23N 1/082* (2013.01); *F23N 5/16* (2013.01); F23R 2900/00013 (2013.01)

(58) Field of Classification Search
CPC ............... F02C 3/30; F02C 9/40; F23K 5/10; F23N 2025/04; F23N 5/16; F23R 2900/00013; F23R 3/343
USPC ............ 431/2, 4, 12, 19; 60/39.53, 775
See application file for complete search history.

(56) References Cited

U.S. PATENT DOCUMENTS

| | | | | |
|---|---|---|---|---|
| 3,921,389 A * | 11/1975 | Kawaguchi | ...................... | 60/775 |
| 3,982,878 A * | 9/1976 | Yamane et al. | ..................... | 431/2 |
| 4,110,973 A * | 9/1978 | Haeflich et al. | ................. | 60/775 |
| 4,189,914 A * | 2/1980 | Marek et al. | ..................... | 60/726 |
| 4,637,735 A * | 1/1987 | de Ris et al. | ..................... | 374/8 |
| 5,170,727 A * | 12/1992 | Nielsen | ......................... | 110/346 |
| 5,257,496 A * | 11/1993 | Brown et al. | .................... | 60/773 |
| 5,318,436 A | 6/1994 | Colket, III et al. | | |
| 5,428,951 A * | 7/1995 | Wilson et al. | ................... | 60/776 |
| 5,487,266 A * | 1/1996 | Brown | ............................ | 60/776 |
| 5,640,841 A * | 6/1997 | Crosby | ............................. | 60/776 |
| 5,791,889 A * | 8/1998 | Gemmen et al. | .................. | 431/1 |
| 5,809,769 A * | 9/1998 | Richards et al. | ................ | 60/776 |
| 5,987,875 A * | 11/1999 | Hilburn et al. | .................. | 60/775 |
| 6,010,544 A * | 1/2000 | Haldeman et al. | .............. | 44/301 |
| 6,201,029 B1 | 3/2001 | Waycuilis | | |
| 6,202,401 B1 * | 3/2001 | Seume et al. | .................... | 60/776 |
| 6,205,764 B1 * | 3/2001 | Hermann et al. | ............... | 60/776 |
| 6,418,724 B1 * | 7/2002 | Cheng | ............................. | 60/775 |
| 6,434,945 B1 * | 8/2002 | Mandai et al. | ................... | 60/740 |
| 6,460,341 B1 * | 10/2002 | Gutmark et al. | ................. | 60/772 |
| 6,522,991 B2 * | 2/2003 | Banaszuk et al. | ............. | 702/138 |
| 6,701,713 B2 | 3/2004 | Mandai et al. | | |
| 6,715,295 B2 * | 4/2004 | Gadde et al. | .................... | 60/775 |
| 6,721,631 B2 * | 4/2004 | Shimizu et al. | ................ | 700/287 |
| 6,748,745 B2 | 6/2004 | Ul Karim et al. | | |
| 6,857,271 B2 * | 2/2005 | Kraft et al. | ........................ | 60/737 |
| 7,143,583 B2 | 12/2006 | Hayashi et al. | | |
| 7,435,080 B2 * | 10/2008 | Joklik et al. | ........................ | 431/4 |
| 7,457,710 B2 * | 11/2008 | Schuermans et al. | ........... | 702/30 |
| 7,513,117 B2 * | 4/2009 | Garay et al. | ..................... | 60/772 |

(Continued)

FOREIGN PATENT DOCUMENTS

DE    3606625 A1 *    9/1986 ................ F23R 3/34

*Primary Examiner* — Jorge Pereiro

(57) ABSTRACT

A method of influencing combustion dynamics, including measuring a combustion dynamics parameter, and controlling a diluent flow (26) delivered to a fuel flow (32) upstream of a pilot burner fuel outlet (40) in response to the measured combustion dynamics parameter.

19 Claims, 1 Drawing Sheet

(56) References Cited

U.S. PATENT DOCUMENTS

| | | | |
|---|---|---|---|
| 7,640,725 B2* | 1/2010 | Bland et al. | 60/39.281 |
| 7,726,133 B2* | 6/2010 | Hannemann et al. | 60/780 |
| 7,874,157 B2* | 1/2011 | Evulet et al. | 60/740 |
| 7,934,924 B2* | 5/2011 | Joklik et al. | 431/4 |
| 8,028,512 B2* | 10/2011 | Mendoza et al. | 60/39.281 |
| 8,061,117 B2* | 11/2011 | Cheng | 60/39.281 |
| 8,176,739 B2* | 5/2012 | Evulet et al. | 60/733 |
| 8,177,547 B2* | 5/2012 | Kostlin et al. | 431/284 |
| 8,192,688 B2* | 6/2012 | Hagen et al. | 422/129 |
| 8,240,150 B2* | 8/2012 | Varatharajan et al. | 60/737 |
| 8,377,232 B2* | 2/2013 | Myers et al. | 134/166 R |
| 8,406,978 B2* | 3/2013 | Nomura et al. | 701/100 |
| 2002/0162317 A1* | 11/2002 | Banaszuk et al. | 60/204 |
| 2003/0014219 A1* | 1/2003 | Shimizu et al. | 702/184 |
| 2003/0217553 A1* | 11/2003 | Gadde et al. | 60/775 |
| 2004/0025512 A1* | 2/2004 | Davis et al. | 60/773 |
| 2004/0172951 A1* | 9/2004 | Hannemann et al. | 60/776 |
| 2006/0046218 A1* | 3/2006 | Joklik et al. | 431/75 |
| 2007/0039329 A1* | 2/2007 | Abreu et al. | 60/776 |
| 2007/0157624 A1* | 7/2007 | Bland et al. | 60/776 |
| 2007/0271927 A1* | 11/2007 | Myers et al. | 60/776 |
| 2008/0044782 A1* | 2/2008 | Kostlin et al. | 431/284 |
| 2008/0280238 A1 | 11/2008 | Smith et al. | |
| 2008/0295520 A1* | 12/2008 | Cheng | 60/775 |
| 2009/0042151 A1* | 2/2009 | Joklik et al. | 431/4 |
| 2009/0249792 A1* | 10/2009 | Guethe et al. | 60/773 |
| 2009/0314000 A1* | 12/2009 | Evulet et al. | 60/772 |
| 2010/0031661 A1* | 2/2010 | Varatharajan et al. | 60/737 |
| 2010/0192577 A1* | 8/2010 | Singh et al. | 60/725 |
| 2011/0000219 A1* | 1/2011 | Myers et al. | 60/776 |
| 2011/0183275 A1* | 7/2011 | Kuske et al. | 431/3 |
| 2011/0289932 A1* | 12/2011 | Thompson | 60/776 |
| 2011/0300493 A1* | 12/2011 | Mittricker et al. | 431/12 |
| 2013/0133331 A1* | 5/2013 | Singh et al. | 60/772 |

* cited by examiner

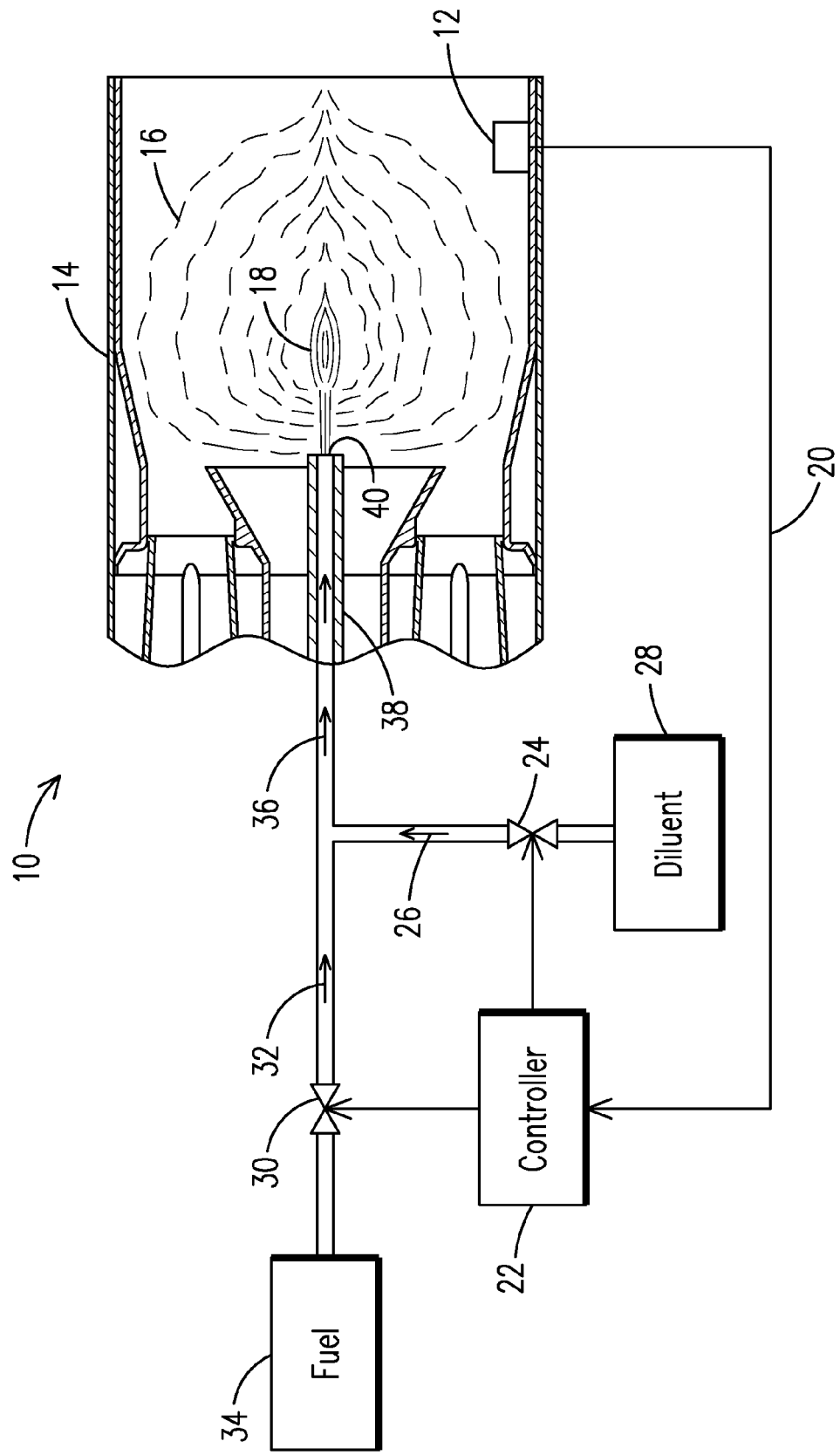

UTILIZING A DILUENT TO LOWER COMBUSTION INSTABILITIES IN A GAS TURBINE ENGINE

FIELD OF THE INVENTION

The invention relates to controlling combustion dynamics in a gas turbine engine. More particularly, this invention relates to controlling combustion dynamics by controlling characteristics of the pilot flame in the gas turbine engine.

BACKGROUND OF THE INVENTION

Gas turbine engines are known to include a compressor for compressing air, a combustor for producing a hot gas by burning fuel in the presence of the compressed air produced by the compressor, and a turbine for expanding the hot gas to extract shaft power. Gas turbine engines using annular combustion systems typically include a plurality of individual burners disposed in a ring about an axial centerline for providing a mixture of fuel and air to an annular combustion chamber disposed upstream of the annular turbine inlet vanes. Other gas turbines use can-annular combustors wherein individual burner cans feed hot combustion gas into respective individual portions of the arc of the turbine inlet vanes. Each can includes a plurality of main burners disposed in a ring around a central pilot burner.

During operation, the combustion process can generate combustion oscillations, also known as combustion dynamics. Combustion oscillations in general are acoustic oscillations which are excited by the combustion itself. The frequency of the combustion oscillations is influenced by an interaction of the combustion flame with the structure surrounding the combustion flame. Since the structure of the combustor surrounding the combustion flame is often complicated, and varies from one combustor to another, and the combustion flame itself may vary over time, it is difficult to predict the frequency at which combustion oscillations occur. As a result, combustion oscillations may be monitored during operation and parameters may be adjusted in order to influence the interaction of the combustion flame with its environment.

In many combustors, a pilot burner is surrounded by other main burners. The pilot burner is used to stabilize the combustion flame resulting from the mix of the fuel and air from the pilot and main burners, because a relatively rich fuel/air pilot flame inside the combustion flame provides stability for the relatively lean fuel/air ratios coming from the main burners. This stability in turn reduces combustion dynamics. Since the pilot flame has an ability to influence the combustion flame, and thus the interaction of the combustion flame with its environment, adjusting the pilot flame has been used as a way to influence/control combustion dynamics.

Some systems employ diffusion pilot burners where fuel is sprayed directly into the combustion flame. A diffusion pilot burner may be used because diffusion burners are very stable. Some burners are premix burners. In a premix burner, a supply of fuel is injected into an airstream within the burner, and is often swirled together via a swirler to mix the fuel and air. The mixed fuel and air is then delivered to the combustion flame. Premix burners are often used as main burners surrounding a pilot burner. The fuel/air ratio from burner to burner may be varied by separately controlling the fuel flow to different burners, which is known as staging. Some pilot burners employ both a diffusion stage and a premix stage to supply fuel and a fuel/air mixture respectively to the combustion flame.

Adjusting the pilot flame of a diffusion burner by adding more fuel may stabilize combustion, but may have adverse effects as well, including increased fuel consumption and poor emissions. As a result, there is room in the art for improvement of control of combustion instabilities in a gas turbine engine.

BRIEF DESCRIPTION OF THE DRAWINGS

The invention is explained in the following description in view of the sole FIGURE which is a schematic diagram of showing an embodiment of the method for influencing combustion dynamics.

DETAILED DESCRIPTION OF THE INVENTION

In the prior art, it is known to adjust the pilot flame of a burner by controlling the amount of fuel delivered to the pilot burner fuel outlet in order to affect the combustion dynamics of the burner. The present inventor has recognized that increasing the pilot fuel flow improves the stability of a combustion flame not only because it increases the energy of the pilot flame, but also because it changes the size, shape, and location of the pilot flame within the combustion flame. The present inventor has devised an alternative and innovative way to change the size, shape, and location of the pilot flame to influence the combustion flame and related combustion dynamics, and in an embodiment does so without changing the energy of the pilot flame. The method of the present invention avoids the drawbacks of the prior art, such as increased fuel consumption and increased unfavorable emissions associated with increased pilot flame energy, while still permitting sufficient influence over combustion dynamics.

In particular, in the prior art, the amount of energy present in the pilot flame will depend primarily on the amount of fuel being delivered to the pilot flame. However, the size, shape, and location of the pilot flame may be influenced by the mass flow rate (i.e. penetration) of the fluid flow into the combustion flame. When fuel is the only fluid being delivered to the pilot flame, as is the case in a diffusion pilot burner, then it is the mass flow rate of the fuel that dictates these parameters of the pilot flame. However, as is an inventive concept here, if one adds a diluent fluid to the fuel flow then the mass flow rate of a fluid flow into the pilot flame, i.e. the combined flow, or diluted flow, can be adjusted independent of a mass flow rate of the fuel being delivered to the pilot flame. This permits one to adjust the size, shape, and location of the pilot flame in a manner that is less dependent, or entirely independent, of the fuel flow rate, unlike the prior art. Adding diluent is particularly advantageous for diffusion pilot burners, or hybrid diffusion/premix pilot burners, because in a diffusion burner a supply of pure fuel is delivered to the flame. However, the teachings herein can also be applied to the fuel supply line of a premix burner when there is no diffusion burner because diluting the fuel that is injected into an airflow will still influence the combustion dynamics.

As used herein, a diluent is a fluid (added to a fuel flow upstream of a pilot burner fuel outlet) that adds less energy to a pilot flame than a same volume of fuel would. In other words, a diluted fluid flow into the pilot flame will deliver less energy to the pilot flame than would a same volume of pure fuel would. The diluent may itself add energy to the pilot flame, but less energy per unit volume than fuel would. An inert diluent, such as nitrogen, may contribute no additional energy to the pilot flame. A diluent may alternatively be a fuel with a lower heating value than the fuel primarily being used. In both cases a diluted flow would deliver less energy to a pilot flame than would a pure fuel flow of the same volume. The diluted flow is diluted in terms of energy delivered to the pilot flame with respect to an equivalent pure fuel flow of the same mass flow rate as the diluted flow.

If the diluent delivers no energy, or negligible energy, to the pilot flame, one can change the size, shape, and location of the pilot flame without changing the energy of the pilot flame. Since the disadvantages of the prior art, i.e. increased fuel consumption and increased unfavorable emissions, are the result of increased energy (i.e. fuel) to the pilot flame, the disadvantages of the prior art may eliminated with this method, while still allowing one to realize the benefits of being able to adjust the pilot flame and influence combustion dynamics.

The choice of phase and chemical composition of the diluent fluid will affect the impact that the fluid has on the pilot flame. The diluent fluid can be a liquid fluid, or a gaseous fluid. A diluent that is in the same state as the fuel may mix more readily with the fuel, and provide a more uniform pilot flame. For example, if the fuel is a liquid, one could add a liquid diluent to the liquid fuel. However, if one wished for a less uniform pilot flame, one may mix a gaseous second liquid with a liquid fuel. Such a mixture may not mix as well, and the resulting pilot flame may not be as uniform. A lack of uniformity of the combustion flame may result from a lack of uniformity of the pilot flame. Less uniform combustion flames generate fewer/lower intensity combustion dynamics than do uniform combustion flames, which may be advantageous.

The diluent may be a fluid whose presence has no significant impact on the energy in the pilot flame as noted above. It is in this case that the location, size, and shape of the flame may be adjusted completely independently of the energy to the pilot flame. This may occur because the mass flow rate of the dilute flow would be different, but the amount of energy delivered to the flame would remain the same. The diluent may alternatively be a fluid that itself delivers usable energy to the pilot flame. For example, the diluent may add less energy to the pilot flame than would pure fuel, but more than if the diluent were inert. In such a scenario the diluted flow would result in less energy to the pilot flame per unit volume than would be delivered if a same volume of a pure fuel were delivered to the pilot flame. However, it would result in more energy in the pilot flame than a diluent flow of fuel and an inert diluent. Similar to changing fuel flow only, in a situation where the diluent itself delivers energy to the pilot flame, an increase in the diluted flow would change all characteristics at the same time, (i.e. the amount of energy to the pilot flame would change as well as the other parameters). The change in the pilot flame would not be the same as it would were pure fuel being delivered to the pilot flame, because the composition of the diluted flow would be different. As a result, for a given mass flow rate of fluid into the pilot flame, the pilot flame characteristics resulting from a diluted flow using a diluent that also delivers energy to the pilot flame will be different that the pilot flame characteristics of a flow of pure fuel of the same mass flow rate. Choosing a diluent that also has the capacity to increase the amount of energy in the pilot flame affords one the option of changing all the characteristic of the pilot flow at the same time but in a different way than they would change were the fuel flow itself increased.

Often a pilot flame is operated as cool as possible while still maintaining combustion flame stability. As a result it is expected that a diluent flow will often be added to an existing fuel flow to increase the mass flow rate of the fluid i.e. the diluted flow into the pilot flame to influence combustion dynamics. However, it is also entirely possible that fuel flow may also be increased or decreased in an effort to influence dynamics in conjunction with an increase, decrease, or maintenance of a diluent flow. There may also be times when no diluent is used. Thus, controlling a diluent flow to influence combustion dynamics includes times when the diluent flow is zero, and only fuel is being delivered to the pilot flame. Such periods of zero diluent flow are envisioned and considered to be a normal state that will occur periodically during operation of the gas turbine combustor when these teachings are employed.

At any given time during operation the fluid flow into the pilot flame may be pure fuel, or it may be a diluted flow of fuel and diluent. In light of the above indicated possibilities, in order to influence combustion dynamics the fluid flow into the pilot flame may decrease if the fuel flow is decreased and diluent flow is not increased, if the fuel flow remains the same but the diluent flow decreases, or if fuel is decreased and diluent flow is increased in an amount less than the decrease of fuel. The fluid flow into the pilot flame may remain the same if the fuel flow and the diluent flow do not change or change the same amount but in opposite directions. The fluid flow into the pilot flame may increase if the fuel flow increases and the diluent flow does not change, if the fuel flow remains the same and the diluent flow increases, or if the fuel flow decreases but the diluent flow increases more than the fuel flow decreases. All of the above scenarios are envisioned by the inventor as ways to influence combustion dynamics.

A wide variety of diluents are available. Some diluents may already be present in the gas turbine engine and include shell air and compressed air. These are ideal in terms of availability, but the oxygen in air may influence the combustion and hence whether it is used or another diluent is used. Another diluent may be an inert diluent such as, but not limited to, nitrogen. Using nitrogen permits a great degree of control of the pilot flame because it does not burn, and thus only the known combustion characteristics of the fuel need be considered. Steam and water may also be selected for their influence on the pilot flame.

It has been shown that with the option of adding and controlling a flow of a diluent into the fuel supply of a pilot burner, one can periodically add no diluent and rely on known pilot flame control methods using fuel only, or one can add diluent in order to influence combustion dynamics. When adding diluent, one can influence the pilot flame by choosing the state of the diluent to match or not match that of the fuel used. Manipulating the physical composition of the fluid flow into the pilot flame in this manner may alter the pilot flame, and thus influence the combustion dynamics. One can add diluent that itself delivers some energy to the pilot flame (but less than that of the fuel) so one can control all the flame parameters at the same time (similar to the prior art fuel only control), but with different results in the pilot flame than that of the prior art, providing another way to influence combustion dynamics, adding versatility to the control. One can also add diluent that adds no (or negligible) energy to the flame, allowing one to maintain the same energy in the pilot flame but change the other parameters in order to influence combustion dynamics, adding even further versatility to the control.

Further, one can superimpose diluent control onto existing fuel flows (i.e. add diluent to fuel flow rates already known and used in gas turbine engine operation) as an additive means for influencing combustion dynamics, or one can influence dynamics by adjusting fuel flow together with diluent flow. In the former case, fuel flow would be controlled as if no diluent were present, and required diluent flow would be calculated as if fuel flow were a given. Such may be the case where the teachings herein are applied to an existing system as a retrofit. In the latter case, fuel flow and diluent flow may work in concert to influence combustion dynamics, capitalizing on the benefits of changes to each in determining the ultimate composition of the fluid to be delivered to the pilot flame.

Combustion dynamics encompass a multitude of parameters and each or all of the parameters can be monitored. For example, pressure sensors can measure pressure waves, optical sensors can measure optical flame parameters, temperature sensors can measure flame temperature etc. This information can be monitored and a determination can be made if the combustion dynamics are to be influenced based on the information. Algorithms present in a controller can determine what changes to the diluent flow and/or fuel flow need to be made in order to bring about the desired combustion dynamics, and the controller can implement the necessary changes by controlling diluent flow control valve(s) alone or in conjunction with fuel flow control valve(s).

The sole FIGURE schematically depicts such a system 10. A sensor 12 associated with a combustor 14 monitors combustion dynamics resulting from the combustion flame 16 and pilot flame 18 within the combustion flame 16. Monitored combustion dynamics data is delivered 20 to a controller 22. Controller 22 determines if an influence of combustion dynamics is necessary, and if so, what flow changes need to be made. Controller then controls diluent flow control valve 24 and the associated diluent flow 26 from a diluent supply 28, and fuel flow control valve 30 and the associated fuel flow 32 from a fuel supply 34 to form an appropriate fluid flow 36 to be delivered to the pilot flame 18 via a pilot burner 38 and pilot burner fuel outlet 40 to effect the desired influence. Pilot burner 36 may be a diffusion pilot burner only, a premix burner, or a combination diffusion/premix burner.

Another disadvantage present in the prior art is that when only fuel is used, over time the high heat from combustion and periodic low flow rates of the fuel may cause the fuel to coke and clog, or reduce the diameter of, the fuel supply line at the fuel outlet, resulting in a malfunctioning pilot burner. Correcting this situation can be costly, especially in terms of down time. With the present system, when conditions are such that a fuel-only flow might tend to coke and clog the fuel supply line, a flow of diluent can be added to the fuel flow to prevent the clogging. Adding diluent would speed the fuel through the nozzle because the fuel would be mixed with the diluent, increasing the mass flow rate of the fluid to the pilot flame, and reducing the exposure of the fuel in that fluid to the pilot flame to the conditions that cause coking. In other words, the same amount of fuel would flow to the pilot flame, but in a faster moving diluted flow, and so the fuel in the diluted flow would have less time to heat up and coke before being delivered to the pilot flame. In addition, due to the pressures of combustion, under the prior art fuel must constantly be flowed through the fuel outlet to prevent this clogging, even at times when the combustion process does not need the stabilizing effects of the fuel itself. In such a situation the expensive fuel is not being used for its best use, and a much less expensive diluent can be used in place of the fuel flow, as opposed to in addition to the fuel flow. Using a diluent will not only prevent the coking and clogging, but will reduce costs associated with the unnecessarily consumed fuel.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method of influencing combustion dynamics, comprising:
    measuring pressure oscillations within a combustor; and
    controlling a non-fuel diluent flow that is delivered only to a fuel flow upstream of a pilot burner fuel outlet in response to the measured pressure oscillations,
    wherein the controlling occurs independent of control of a flow of fuel to an associated premix main burner,
    wherein the associated premix main burner is one of a plurality of premix main burners disposed in an annular array surrounding the pilot burner, and
    wherein the plurality of premix main burners and the pilot burner are disposed within the combustor and are effective to create a single combustion flame comprising a pilot flame formed by the pilot burner.

2. The method of claim 1, wherein the pilot burner is a diffusion pilot burner.

3. The method of claim 1, wherein the fuel flow and diluent flow form a diluted flow and the diluted flow rate is greater than a fuel flow rate when the diluent is added.

4. The method of claim 3, wherein the fuel flow rate is not reduced when the diluent is added.

5. The method of claim 1, wherein a fuel flow rate is not changed.

6. The method of claim 1, further comprising controlling diluent flow to prevent clogging of the pilot burner fuel outlet.

7. The method of claim 1, wherein the diluent is in gas form.

8. The method of claim 1, wherein the diluent is inert.

9. The method of claim 1, wherein the diluent is nitrogen.

10. The method of claim 1, wherein the non-fuel diluent is characterized by a different phase than the fuel.

11. A method of influencing combustion dynamics in a gas turbine engine, comprising:
    monitoring a combustor for a combustion dynamics parameter associated with pressure oscillations; and
    adjusting a pilot flame parameter in response to the combustion dynamics parameter by controlling a non-fuel diluent flow into a fuel flow and delivering a combined flow only to a pilot flame through a pilot burner fuel outlet, wherein the controlling of the non-fuel diluent flow occurs independent of control of a flow of fuel to an associated premix main burner,
    wherein the associated premix main burner is one of a plurality of premix main burners disposed in an annular array surrounding the pilot burner, and
    wherein the plurality of premix main burners and the pilot burner are disposed within the combustor and are effective to create a single combustion flame comprising a pilot flame formed by the pilot burner.

12. The method of claim 11, wherein the pilot burner is a diffusion pilot burner.

13. The method of claim 11, wherein a combined flow rate is greater than a fuel flow rate.

14. The method of claim 11, wherein a fuel flow rate is not adjusted when the diluent flow is added.

15. The method of claim 11, wherein a fuel flow rate is not adjusted.

16. The method of claim 11, further comprising controlling the diluent to prevent clogging of the pilot burner fuel outlet.

17. The method of claim 11, wherein the diluent is inert.

18. The method of claim 11, wherein the diluent is nitrogen.

19. A method of influencing combustion dynamics in a combustor of a gas turbine engine, the combustor including premix main burners disposed in an annular array around a diffusion pilot burner, the method comprising:

monitoring a pressure-oscillation related combustion dynamics parameter, and controlling a flow of a diluent delivered to a fuel flow dedicated to a pilot burner but not to a fuel flow dedicated to the premix main burners in response to the combustion dynamics parameter, wherein the controlling occurs independent of control of a flow of fuel to the premix main burners and a control of a flow of fuel to the pilot burner, wherein the diluent contributes no energy to a pilot flame associated with the pilot burner, and wherein the premix main burners are disposed in an annular array surrounding the pilot burner and are effective to create a single combustion flame comprising a pilot flame formed by the pilot burner.

* * * * *